Figure 1:
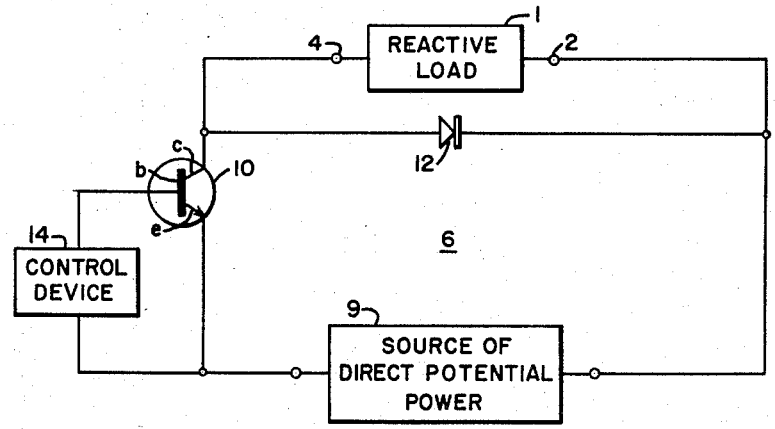

June 15, 1965     L. L. TIPTON     3,189,796
APPARATUS FOR SUPPRESSING TRANSIENTS DURING SWITCHING
Filed Nov. 14, 1961

WITNESSES:
Bernard R. Gieguay
James T. Young

INVENTOR
Lynn L. Tipton
BY
John L. Stoughton
ATTORNEY

United States Patent Office 3,189,796
Patented June 15, 1965

3,189,796
APPARATUS FOR SUPPRESSING TRANSIENTS DURING SWITCHING
Lynn L. Tipton, Lima, Ohio, assignor to Westinghouse Electric Corporation, East Pittsburgh, Pa., a corporation of Pennsylvania
Filed Nov. 14, 1961, Ser. No. 152,334
17 Claims. (Cl. 317—148.5)

This application relates generally to electrical switching circuits and more particularly to such circuits which embody transistors to connect and disconnect an inductive load from a source of electrical power.

When inductive or reactive loads are interrupted as opening of a switching device, the current cannot immediately terminate, but will continue to flow until the stored energy has been dissipated. For many reasons it is desirable that the switching device be opened rapidly and for the current therethrough to terminate abruptly. Unless some means is provided for dissipating the reactive power in the load, abrupt termination of the current cannot occur without arcing or breakdown of the switching device.

In the past this has been overcome to a great extent by the provision of a rectifier or other asymmetric current controlling device connected in shunt with the reactive load so that upon opening of the switching device the reactive current will flow through the rectifier and circulate through the load in a circuit which is independent of the switching device. Such an arrangement has worked satisfactorily as far as "turn off" is concerned but leaves much to be desired upon a subsequent "turn on."

When the rectifier conducted during "turn off," the reverse bias which prevented current flow through the rectifier in the reverse direction vanished. It cannot be reestablished until subsequent to the existence of a reverse voltage thereacross which does not occur until the reclosure of the switch which, in the instance shown, is the rendering of the transistor reconducting. The reestablishment of the reverse bias requires a short but finite time, and until it is reestablished, reverse current will flow through the rectifier in the form of a sharp current spike. This spike is very undesirable especially when semiconductor switching devices are used which are critical with respect to overload current.

It is, of course, possible to provide a switching device which is substantial enough in current carrying capacity to stand this current spike, but this results in a switching device the capacity of which is only partially used during the major portion of its operating time.

It is an object of my invention to provide an arrangement whereby this current spike may be suppressed substantially so that a smaller switching device may be used.

Another object of my invention is to provide a high impedance in series with the rectifier unit during the interval that the switching device is being closed.

A further object is to utilize a variable impedance device in series with the rectifier unit which presents a low impedance to reactive current flow at "turn off" and a high impedance to current during the period of establishment of the reverse bias across the rectifier.

A still further object of my invention is to provide in series with the load a saturable transformer which presents a low impedance to load current flow and a high impedance to current flow in shunt relation to the load device in the direction of the load current.

Figure 2:
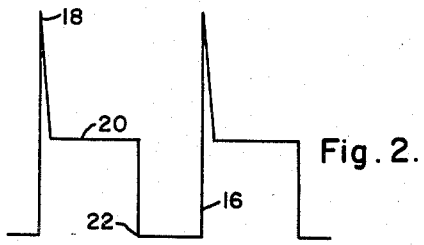
Figure 4:
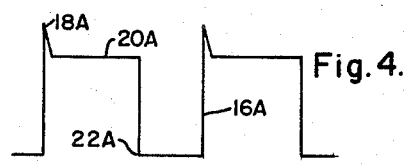
Figure 3:
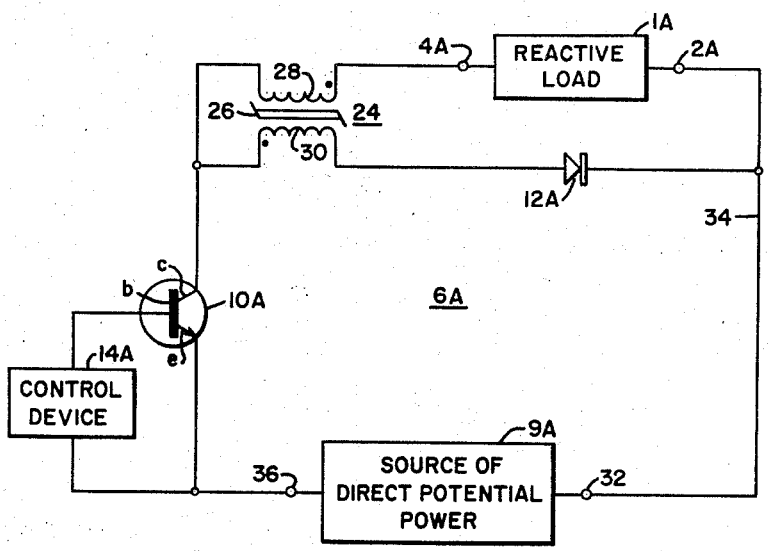

Other objects of the invention will be apparent from the specification, the hereinafter appended claims and the drawings, in which drawings:

FIG. 1 is a schematic view of a prior art circuit;
FIG. 2 is a diagrammatic view showing the current spikes which occur upon initial closure of the switching device of FIG. 1;
FIG. 3 is a schematic view of a circuit similar to that of FIG. 1, but embodying the invention; and,
FIG. 4 is a diagrammatic view showing the substantially reduced current spikes which occur upon closure of the switching device of the circuit of FIG. 3.

Referring to the drawings by characters of reference, the numeral 1 indicates a reactive load device connected between terminals 2 and 4 of a network 6 which is energized from a source of direct potential power 9. The load device 1 is connected to and disconnected from the source 9 by a suitable switching device 10, such as a transistor, the conductive condition of which is controlled by means of a suitable control circuit 14 connected between its emitter $e$ and the base $b$. It is desirable that the transistor 10 operate in its switching mode, and, therefore, the control circuit 14 should have an output voltage with steep initial and terminating wave fronts. A rectifier 12, which may be of a semiconductor type, is connected between the output terminals 2 and 4.

The curve 16 represents the current through the transistor 10 and it will be noted that a current spike 18 occurs upon initial conduction of the valve 10 which thereafter levels off to a current value 20 during the remainder of the conducting period of the transistor 10. The current through the transistor 10 sharply decreases to a zero value 22 when a blocking signal is applied to the transistor 10. This is possible since the rectifier 12 effectively short circuits the load 1 and causes the stored energy to be dissipated in the load 1.

In the circuit shown in FIG. 3 parts which are the same as those in the circuit of FIG. 1 are identified by like reference characters plus the suffix A. The circuit of FIG. 3 is additionally provided with a transformer 24 having windings 28 and 30 inductively coupled with a core 26 which is preferably of a material having a substantially rectangular hysteresis loop and having a high residual value of flux. The dimensions of the core 26 are so correlated with respect to the current required by the reactive load 1A that the core 26 saturates upon conduction of the transistor 10A to provide a low impedance across the winding 28. The dotted end of the winding 28 is connected to the terminal 4A while the plain end of the winding 28 is connected to the collector $c$ of the transistor 10A. The dotted end of the winding 30 is connected to the plain end of the winding 28 and the plain end of the winding 30 is connected through rectifier 12A to the terminal 2A.

It is believed that the remainder of the construction may best be understood by a description of the operation thereof which is as follows: Assume that the apparatus has been in operation and that transistor 10A was previously conducting but has been rendered non-conductive. As will be explained below, this will result in a certain residual flux in the core 26 which we shall arbitrarily define as in the plus direction which is in the direction of saturation produced by current flowing into the dot end of the windings. Further, at this time, no voltage drop exists across the rectifier 12A. If now the control device 14A renders the transistor 10A conducting, current will flow from the source terminal 32 through conductor 34, reversedly through the rectifier 12A, winding 30, and transistor 10A to the load terminal 36. In the case of the prior art circuit 6, this current is substantial and produces the spike 18. In the case of the circuit 6A this current is substantially attenuated due to the impedance of the winding 30 since this current tends to reverse or lower the flux in the core 26 from its plus residual value. The rate of increase of reverse current through rectifier 12A is greater than that which flows though load 1A and winding 28 and results in a positive reversal or decrease in flux in core 26 from the residual value, consequently, the high impedance in winding 30 and reduced spike 18A. Because of this decreased value of core flux, the initial current flow through the load 1A and winding 28 will induce a voltage in the winding 30, but this occurs subsequent to the reverse recovery time of the rectifier 12A and is unobjectionable since no substantial current flows because of this voltage.

Initially, the winding 28 will provide impedance in the load circuit, but very shortly the current therethrough will saturate the core 26 and the impedance of the winding 28 will become very small so that substantially a full load current will flow through the load 1A.

At a later time, depending on the control device 14A, the transistor 10A will be rendered non-conductive. When this occurs, reactive current due to the reactive nature of the load 1A will continue to flow through the winding 28, but instead of flowing through the transistor 10A, it will flow through the winding 30 and the rectifier 12A back to the load terminal 2A. The direction of this current through the winding 30 is of the same polar direction as in the winding 28 and a relatively low impedance path is afforded. The reactive current continues to flow until the reactive power stored in load 1A has been dissipated. The flux in the core 26 reduces to the positive residual flux value which in the case of square wave core material is normally not greatly less than the saturating value. While core materials having other forms of hysteresis loops and of materials or constructions with less residual flux may be used, this residual and square core material will have less losses and generate less voltage during the intervals that the core 26 is resaturating after a turn-off interval.

In at least some instances, as for example if the $L/R$ constant of the load 1A is high and an alternating or pulsating potential is supplied by the control device 14A, the "off-time" of the transistor 10A may be less than the decay time of this reactive current in the load 1A so that the current through the rectifier 12A in the forward direction will still be of a substantial value. Under these conditions, the flux in the core 26 will be above the residual value and, under most conditions, will remain saturated in the plus direction.

The winding 30, however, will continue to exhibit a low impedance to current in the forward direction of the rectifier 12A and a high impedance in the reverse direction whereby the spikes will be eliminated or severely attenuated in much the same manner as in the instance in which the reactive current completely decays. It will be apparent that when the core remains saturated the reconduction of the transistor 10A will cause a lesser voltage to be induced in the winding 30 by the increasing current through the load 1A and winding 28 than would occur if the core went out of saturation. Since the voltage across the rectifier 12A will not be zero, at the time of the "turn on" of transistor 10A but will be in the forward direction, the need for limitation of the spike current becomes at least as great if not greater than in the preceding instance and the invention is equally applicable to this operating condition.

While the invention is particularly applicable to circuits which utilize semiconductor devices for the switch and for the rectifier, it will be appreciated that it is also applicable to prevent current spikes through other types of switching devices which might tend to become overheated or to otherwise destroy themselves due to this excess current flow. It will further be appreciated that while the current wave of FIG. 4 shows the operation of the circuit 6A with a control device having a reoccurring cycle, it is equally adapted to any circuit which is switched on and off irrespective of any changes in lengths of the on and off periods of their periodicity or lack of periodicity.

Although the invention has been described with reference to a certain specific embodiment thereof, numerous modifications falling within the spirit and scope of the invention are possible, and it is desired to cover all such modifications falling within the spirit and scope of the invention.

What is claimed and is desired to be secured by United States Letters Patent is as follows:

1. In an electrical network, a pair of input terminals, a pair of output terminals, a switch, an inductive device having a magnetic material core and a first winding and a second winding, said first and second windings being magnetically coupled to said core, a current path interconnecting said pair of input terminals to said pair of output terminals and including said switch and said first winding, said core being proportioned to saturate within the operating range of current flow through said path, an asymmetric current controlling device, and means connecting said asymmetric device in series with said second winding to provide a first circuit, and means connecting said first circuit in series circuit with said output terminals and said first winding.

2. In an electrical network, a pair of input terminals, a pair of output terminals, a semiconductor switch, an inductive device having a magnetic material core and a first winding and a second winding, said first and second windings being magnetically coupled to said core, a current path interconnecting said pair of input terminals to said pair of output terminals and including said switch and said first winding, said core being proportioned to saturate at a small percentage of the operating range of current in said path, a semiconductor asymmetric current controlling device, and means connecting said asymmetric device in series with said second winding to provide a first circuit, and means connecting said first circuit in series circuit with said output terminals and said first winding.

3. In an electrical network, first and second input terminals, first and second output terminals, a magnetic device having a saturable magnetic core and first and second windings inductively coupled with said core, a controllable semiconductor device having a pair of main terminals and control means for controlling at least the initiation of current flow between said main terminals, first circuit means connecting said first winding and said main terminals in series between said first terminals, second circuit means connecting said second terminals together, a rectifier, a third circuit means connecting said rectifier and said second winding in series between said second circuit means and a point in said first circuit means intermediate said controllable semiconductor device and said first winding.

4. In an electrical network, first and second input terminals, first and second output terminals, a magnetic device having a saturable magnetic core and first and second windings inductively coupled with said core, a controllable semiconductor device having a pair of main terminals and control means for controlling at least the initiation of current flow between said main terminals, first circuit means connecting said first winding and said main terminals in series between said first terminals with said first winding intermediate said controllable device and said first output terminal, second circuit means connecting said second terminals together, a rectifier, third circuit means connecting said rectifier and said second winding in series between said second output terminal and a point in said first circuit means intermediate said controllable semiconductor device and said first winding.

5. In an electrical network, first and second input terminals, first and second output terminals, a saturable core transformer having first and second windings, a controllable device having a pair of main terminals and control means for controlling current flow between said main terminals, first circuit means connecting said first winding and said main terminals in series between said first terminals with said first winding intermediate said controllable device and said first output terminal, second circuit means connecting said second terminals together, a rectifier, third circuit means connecting said rectifier and said second winding in series between said second output terminal and a point in said first circuit means intermediate said controllable device and said first winding.

6. In an electrical network, first and second input terminals, first and second output terminals, a saturable core transformer having first and second windings, said core being of a material having a substantially rectangular hysteresis loop, a transistor having a pair of main terminals and control means for controlling current flow between said main terminals, first circuit means connecting said first winding and said main terminals in series between said first terminals with said first winding intermediate said controllable device and said first output terminal, second circuit means connecting said second terminals together, a semiconductor type rectifier, third circuit means connecting said rectifier and said second winding in series between said second output terminal and a point in said first circuit means intermediate said controllable semiconductor device and said first winding, said rectifier being poled to provide for its lower impedance in a direction opposite to the direction of current flow through said transistor.

7. In a current controlling network, first and second input terminals, first and second output terminals, a saturable core transformer having first and second windings, each said winding having first and second terminals and relatively poled such that said first terminals are of the same polarity relative to their respective said second terminals at each instant, a transistor having main electrodes, a rectifier having first and second terminals and having a low impedance to current flow between its said terminals in a first direction and a higher impedance to current flow between its said terminals in a direction opposite to said first direction, means connecting together said second terminals of said input and output terminals, means connecting said first terminal of said first winding to said first output terminal and said second terminal of said first winding to one of said electrodes and the other of said electrodes to said first input terminal, means connecting said first rectifier terminal to said second output terminal and said second rectifier terminal to said second terminal of said second winding, and means connecting said first terminal of said second winding to said second terminal of said first winding, said rectifier being poled such that its said low impedance is in a direction to conduct current between said output terminals in the same direction as the current flow between said output terminals when said transistor is conducting current between its said main electrode.

8. In a power controlling network, a source of direct current power having first and second terminals, an inductive load having first and second terminals, a saturable core transformer having a core and first and second windings magnetically coupled with said core, each said winding having first terminals and second terminals and poled such that a change in flux in said core in a first direction will render said first terminals at the same polarity relative to their respective said second terminals, a transistor having a current controlling path for current flow in a first direction, a semiconductor rectifier having a low impedance to current flow in one direction and a high impedance to current flow in a direction opposite to said one direction, means connecting together said second terminals of said source and load terminals, means connecting said first terminal of said first winding to said first load terminal and said second terminal of said first winding to said first source terminal and including said path, means connecting said first terminal of said second winding to said second terminal of said first winding, and means connecting said second terminal of said second winding to said second load terminal, said rectifier being poled such that said first direction is in opposition to said one direction.

9. In combination, an energizable apparatus including an energy storing component, a first circuit energizable from a source of potential and including said apparatus and controllable means connecting said apparatus to said force for energizing said apparatus and thereby to store energy in said component, said controllable means being operable to disconnect said circuit from said source, said controllable means being injured when subjected to a current magnitude greater than a predetermined magnitude, said predetermined magnitude being in excess of the magnitude required by said apparatus, reactive means having winding means, a second circuit connected across said component and including a rectifier, said second circuit establishing a path for flow current in a first direction to discharge said component, said second circuit further including all of said winding means of said reactive means, at least a portion of said winding means being in series with said rectifier and said control means across said source for regulating the current flow in said path in a direction opposite to said first direction upon reenergization of said first circuit, said rectifier being capable of conducting a current in said opposite direction of a magnitude greater than said predetermined magnitude following a flow of current therethrough in said first direction.

10. The combination of claim 9 in which said reactive means comprises a magnetic material core and said winding means is magnetically coupled to said core, and means including a portion of said winding means for setting the flux in said core in a direction opposite to the direction of the flux induced in said core as a consequence of current flow through said winding in said opposite direction.

11. The combination of claim 10 in which said flux setting means comprises a second winding on said core connected to be traversed by the current used to energize said apparatus.

12. The combination of claim 11 in which said core is proportioned to be saturated within the operating range of said current which energizes said apparatus.

13. A network comprising a pair of terminals adapted to be energized from a unidirectional source of potential, apparatus including a reactive component, an electric valve, a first winding and a second winding, said first and second windings having reactive impedance, a first circuit including said apparatus and said valve and said first winding, said first circuit being effective when said valve is conductive to charge said component, said windings being magnetically associated with a core which core is proportioned to saturate within the operating range of current into said apparatus, a rectifier, a second circuit for said component effective subsequent to the termination of the conduction of said valve for conduction of current in a first direction to discharge said component, said discharge circuit including said rectifier and said second winding, said rectifier being poled for minimum impedance to current flow in said first direction.

14. The combination of claim 13 in which there is provided a timing means for maintaining said valve conduction for a time interval greater than the time interval required for the current flow through said first circuit to saturate said core.

15. In a network for pulsatingly energizing a reactive load device, an electric valve, a pair of terminals adapted to be energized from a source of unidirectional energy, first circuit means connecting said device across said terminals and including said valve, said circuit being effective when said valve is conducting to energize said device, an inductive device including a core and a winding, a rectifier, a second circuit including said rectifier and said winding, said second circuit being connected to said load device and effective to conduct current in a first direction through said winding and said rectifier to discharge the energy stored in said load device, said rectifier being polarized to present its minimum impedance to current in said first direction, means connected to said valve and actuatable to render said valve in a first operating condition to initiate current flow in said first circuit, and means responsive to current flow in said first circuit to saturate said core whereby said winding presents its minimum impedance to current in said first direction when said valve is rendered in a second operating condition to interrupt current flow in said first circuit.

16. The combination of claim 15 in which means are provided to interrupt current flow through said valve for a time interval less than the time interval required for the discharge of said stored energy.

17. The combination of claim 16 in which said means which saturates said core is a second winding magnetically coupled to said core and connected to be traversed by the current flowing to said load device, and in which said second circuit includes said valve and is connected thereby across said terminal.

References Cited by the Examiner
UNITED STATES PATENTS

| | | |
|---|---|---|
| 2,937,321 | 5/60 | Decker et al. _____ 317—148 X |
| 2,964,651 | 12/60 | Thomas. |
| 2,994,071 | 7/61 | Olson et al. _____ 317—148 X |

SAMUEL BERNSTEIN, *Primary Examiner.*